United States Patent
Deere et al.

(10) Patent No.: US 10,649,099 B2
(45) Date of Patent: May 12, 2020

(54) GAMMA DETECTOR PROTECTION FOR DOWNHOLE OPERATIONS

(71) Applicant: TOLTEQ GROUP, LLC, Cedar Park, TX (US)

(72) Inventors: Paul R. Deere, Cedar Park, TX (US); David Chandos, Salado, TX (US); Jacob Thomas, Leander, TX (US)

(73) Assignee: Tolteq Group, LLC, Cedar Park, TX (US)

( * ) Notice: Subject to any disclaimer, the term of this patent is extended or adjusted under 35 U.S.C. 154(b) by 273 days.

(21) Appl. No.: 15/308,636

(22) PCT Filed: Apr. 29, 2015

(86) PCT No.: PCT/US2015/028323
§ 371 (c)(1),
(2) Date: Nov. 3, 2016

(87) PCT Pub. No.: WO2015/171402
PCT Pub. Date: Nov. 12, 2015

(65) Prior Publication Data
US 2017/0184731 A1 Jun. 29, 2017

Related U.S. Application Data

(60) Provisional application No. 61/988,197, filed on May 3, 2014.

(51) Int. Cl.
*G01T 1/202* (2006.01)
*G01V 5/04* (2006.01)
(Continued)

(52) U.S. Cl.
CPC ............ *G01T 1/2026* (2013.01); *E21B 49/00* (2013.01); *F16F 3/04* (2013.01); *G01T 1/202* (2013.01); *G01V 5/04* (2013.01); *F16F 3/0876* (2013.01)

(58) Field of Classification Search
CPC .......... G01T 1/2026; G01T 1/202; F16F 3/04; F16F 3/0876; E21B 49/00; G01V 5/04
See application file for complete search history.

(56) References Cited

U.S. PATENT DOCUMENTS

| 4,994,673 A | * | 2/1991 | Perna | G01T 1/2002 |
| | | | | 250/361 R |
| 5,047,635 A | * | 9/1991 | Leaney | E21B 47/011 |
| | | | | 250/254 |

(Continued)

FOREIGN PATENT DOCUMENTS

| CN | 1549934 A | 11/2004 |
| CN | 202453508 U | 9/2012 |

(Continued)

OTHER PUBLICATIONS

Chinese Patent Application No. 201580022871.6 First Office Action and Search Report dated Jul. 4, 2018 (16 pages).

(Continued)

*Primary Examiner* — Christine S. Kim
(74) *Attorney, Agent, or Firm* — Conley Rose, P.C.

(57) ABSTRACT

An apparatus and method for protecting sensitive electronics in a gamma radiation detector tool configured to be disposed in a borehole. The apparatus comprises a scintillator crystal and a photomultiplier tube disposed in either a single or individual housings. The housing(s) are bordered by springs configured to dampen axial vibrations. The housing(s) may be dampened from lateral vibrations by a lateral shock reducer on a sleeve that circumscribes the housing(s). The method comprises dampening axial and lateral vibrations to the crystal/photomultiplier during a drilling operation.

29 Claims, 6 Drawing Sheets

(51) Int. Cl.
*E21B 49/00* (2006.01)
*F16F 3/04* (2006.01)
*F16F 3/087* (2006.01)

(56) References Cited

U.S. PATENT DOCUMENTS

| | | | | |
|---|---|---|---|---|
| 5,753,919 | A * | 5/1998 | Prain | G01T 1/20 250/361 R |
| 6,355,932 | B1 | 3/2002 | Frederick | |
| 7,151,254 | B2 * | 12/2006 | Mickael | G01V 5/08 250/269.3 |
| 7,629,584 | B2 * | 12/2009 | Mormann | G01T 1/20 250/361 R |
| 2002/0195564 | A1 | 12/2002 | Frederick et al. | |
| 2005/0224717 | A1 * | 10/2005 | Clarke | G01T 1/20 250/361 R |
| 2006/0192126 | A1 | 8/2006 | Medley et al. | |
| 2009/0283687 | A1 | 11/2009 | Menge | |
| 2010/0032577 | A1 * | 2/2010 | Fruehauf | G01T 1/202 250/368 |
| 2010/0243905 | A1 | 9/2010 | Jones | |
| 2012/0043458 | A1 | 2/2012 | Herr | |
| 2014/0264042 | A1 * | 9/2014 | Sinclair | G01T 1/202 250/362 |
| 2015/0097112 | A1 * | 4/2015 | Sinclair | E21B 36/003 250/254 |

FOREIGN PATENT DOCUMENTS

| | | |
|---|---|---|
| CN | 202970684 U | 6/2013 |
| CN | 103558626 A | 2/2014 |
| EP | 0971243 A1 | 1/2000 |
| RU | 88819 U1 | 11/2009 |
| WO | 2014045058 | 3/2014 |
| WO | 2014171402 | 11/2015 |

OTHER PUBLICATIONS

European Patent Application No. 15789956.8 extended European search report dated Oct. 18, 2017 (7 pages).
Search Report and Written Opinion of PCT/US2015/028323 dated Jul. 27, 2015 (8 pages).
Office Action dated Sep. 12, 2018 issued in Russian Patent Application No. 2016144512 (19 pages).
Chinese Second Office Action dated Apr. 18, 2019, for Application No. 201580022871.6.

* cited by examiner

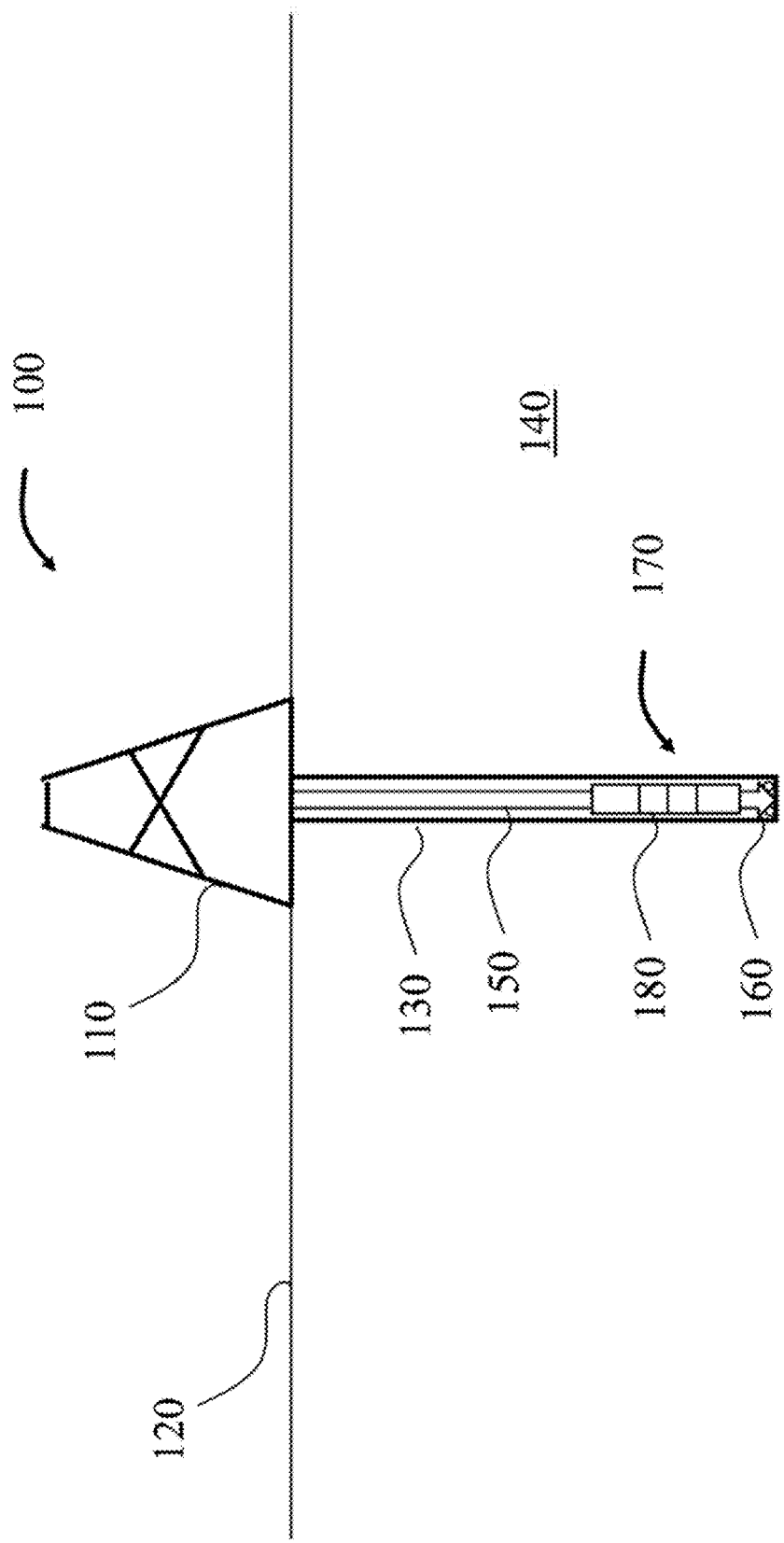

GAMMA DETECTOR PROTECTION FOR DOWNHOLE OPERATIONS

CROSS REFERENCE TO RELATED APPLICATIONS

This application is a 35 U.S.C. § 371 national stage entry of PCT/US2015/028293 filed Apr. 29, 2015, and entitled "Gamma Detector Protection for Downhole Operations." which claims the benefit of Provisional U.S. Patent Application No. 61/988,862, filed May 3, 2014, and entitled "Gamma Detector Protection for Downhole Operations" which are incorporated here by reference in their entireties for all purposes.

STATEMENT REGARDING FEDERALLY SPONSORED RESEARCH OR DEVELOPMENT

Not applicable.

Additional amendments are made to the specification as shown in the substitute specification (provided herewith in clean and marked-up versions). The amendments are matters of form to make the specification better conform to standard U.S. practice and to correct certain matters with respect to grammar and syntax. No new matter is added by these amendments to the specification.

BACKGROUND OF THE DISCLOSURE

Field of the Disclosure

This disclosure relates to the field of downhole tools associated with measurement while-drilling (MWD) in earth formations, especially to reduction of damage to gamma detectors due to mechanical shock and vibration.

Description of the Related Art

Rotary drilling in earth formations is used to form boreholes for obtaining materials in the formations, such as hydrocarbons. Rotary drilling involves a bottom hole assembly disposed on a drilling end of a drill string that extends from the surface. The drill string is made up of a series of tubular members that connect the bottom hole assembly to the surface. The bottom hole assembly may include a drill bit, which, when rotated, may disintegrate the earth formations to drill the borehole. Above and proximate to the drill bit may be formation and/or borehole devices and measurement tools for measuring, recording, and/or reporting information about the condition of the formation, borehole, bottom hole assembly, or other aspects of the drilling environment.

The sensors are configured for operations during drilling and are generally referred to as logging-while-drilling (LWD) or measurement-while-drilling (MWD) sensors. The sensors may include radiation detectors configured to detect gamma rays for estimating properties of the formation. The gamma rays may be naturally occurring (passive) or emitted by the formation in response to a radiation source (active) in the bottom hole assembly.

Central components of a gamma detector include a scintillation crystal, such as a sodium iodide (NaI) crystal, and a photomultiplier tube, to which the scintillation crystal is optically coupled. The output from the photomultiplier tube may be detected by electronics and converted into a gamma ray count or other measure of the strength and frequency of gamma radiation received. The rotation of the drill bit and movement of the drill string in the formation result in physical (mechanical) shocks and vibrations that are transmitted along the drill string to, among other things, sensitive electronic components in the bottom hole assembly, such as the gamma detector. The mechanical shocks and vibrations may damage one or more of the scintillation crystal, the optical coupling, and the electronics of the gamma detector.

Therefore, there is a need for a gamma detector that is resistant to mechanical shocks and vibrations due to downhole drilling operations.

BRIEF SUMMARY OF THE DISCLOSURE

In aspects, the present disclosure is related downhole tools associated with rotary drilling in earth formations. Specifically, the present disclosure is related to reducing damage and wear due to mechanical shock and vibration.

One embodiment includes an apparatus for detecting gamma radiation in a borehole, the apparatus comprising: a chassis configured to be disposed in the borehole; a gamma detector disposed in the chassis and comprising: a scintillation crystal responsive to gamma radiation; and a photomultiplier tube optically coupled to the scintillation crystal; a housing configured to circumscribe the gamma detector and having a first end and a second end; a first axial shock reducer configured to be mechanical communication with the first end and the chassis; and a second axial shock reducer configured to be mechanical communication with the second end and the chassis. The apparatus may also include a first axial shock reducer adapter disposed between the first axial shock reducer and the first end and a second axial shock reducer adapter disposed between the second axial shock reducer and the second end. In aspects, the axial shock reducer adapters may be configured to distribute a force of the axial shock reducers on the ends of the housing evenly or on the perimeter of the ends of the housing. In some aspects, the apparatus may include a sleeve configured to circumscribe the housing. The sleeve may have a recessed portion contiguous between a first end and a second end. The apparatus may also have a lateral shock reducer configured to circumscribe the sleeve. The lateral shock reducer may comprise a contiguous passage between a first end and a second end. The contiguous passage may be non-linear. The contiguous passage may be a recessed portion of the lateral shock reducer or a gap in the lateral shock reducer. The lateral shock reducer may include an elastomeric material. In some aspects, the elastomeric material may include silicone. The lateral shock reducer may include a corrugated metal, and the corrugations may be one or more of radial, longitudinal, or helical. In some aspects, the first axial shock reducer and the second axial shock reducer may each include a spring.

Another embodiment according to the present disclosure includes an apparatus for detecting gamma radiation in a borehole, the apparatus comprising: a chassis configured to be disposed in the borehole; a gamma detector disposed in the chassis and comprising: a scintillation crystal responsive to gamma radiation; a housing configured to circumscribe the scintillation crystal and having an outside end; a photomultiplier tube optically coupled to the scintillation crystal; and a housing configured to circumscribe the photomultiplier tube and having an outside end; a first axial shock reducer configured to be mechanical communication with the outside end of the scintillation crystal housing and the chassis; and a second axial shock reducer configured to be mechanical communication with the outside end of the photomultiplier tube housing and the chassis. The scintillation crystal housing and the photomultiplier housing may be adjacent to one another. The apparatus may also include a first axial shock reducer adapter disposed between the first axial shock reducer and the first end and a second axial shock reducer adapter disposed between the second axial shock reducer and the second end. In aspects, the axial shock reducer adapters may be configured to distribute a force of the axial shock reducers on the ends of the housing evenly or on the perimeter of the ends of the housing. In some aspects, the apparatus may include a sleeve configured to circumscribe the housing. The sleeve may have a recessed portion contiguous between a first end and a second end. The apparatus may also have a lateral shock reducer configured to circumscribe the sleeve. The lateral shock reducer may comprise a contiguous passage between a first end and a second end. The contiguous passage may be non-linear. The contiguous passage may be a recessed portion of the lateral shock reducer or a gap in the lateral shock reducer. The lateral shock reducer may include an elastomeric material. In some aspects, the elastomeric material may include silicone. The lateral shock reducer may include a corrugated metal, and the corrugations may be one or more of radial, longitudinal, or helical. In some aspects, the first axial shock reducer and the second axial shock reducer may each include a spring.

Another embodiment of the present disclosure includes a method for performing a gamma ray detection operation in a borehole, the method comprising: dampening an axial shock to a gamma detector tool, the gamma detector tool comprising: a chassis configured to be disposed in the borehole; a gamma detector disposed in the chassis and comprising: a scintillation crystal responsive to gamma radiation; and a photomultiplier tube optically coupled to the scintillation crystal; a housing configured to circumscribe the gamma detector and having a first end and a second end; a first axial shock reducer configured to be mechanical communication with the first end and the chassis; and a second axial shock reducer configured to be mechanical communication with the second end and the chassis. The method may also include dampening a lateral shock to the gamma detector tool. The method may also include receiving gamma radiation from the earth formation with the scintillation crystal; and converting the gamma radiation into a signal indicative of a gamma count. The dampening of the axial shock step may be performed during a drilling operation.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

A better understanding of the present disclosure can be obtained with the following detailed descriptions of the various disclosed embodiments in the drawings, which are given by way of illustration only, and thus are not limiting the present disclosure, and wherein:

FIG. 1 is a diagram of a drilling system with a bottom hole assembly configured for use in a borehole that includes a downhole gamma detector tool according to one embodiment of the present disclosure;

DETAILED DESCRIPTION OF THE DISCLOSURE

Figure 2A:
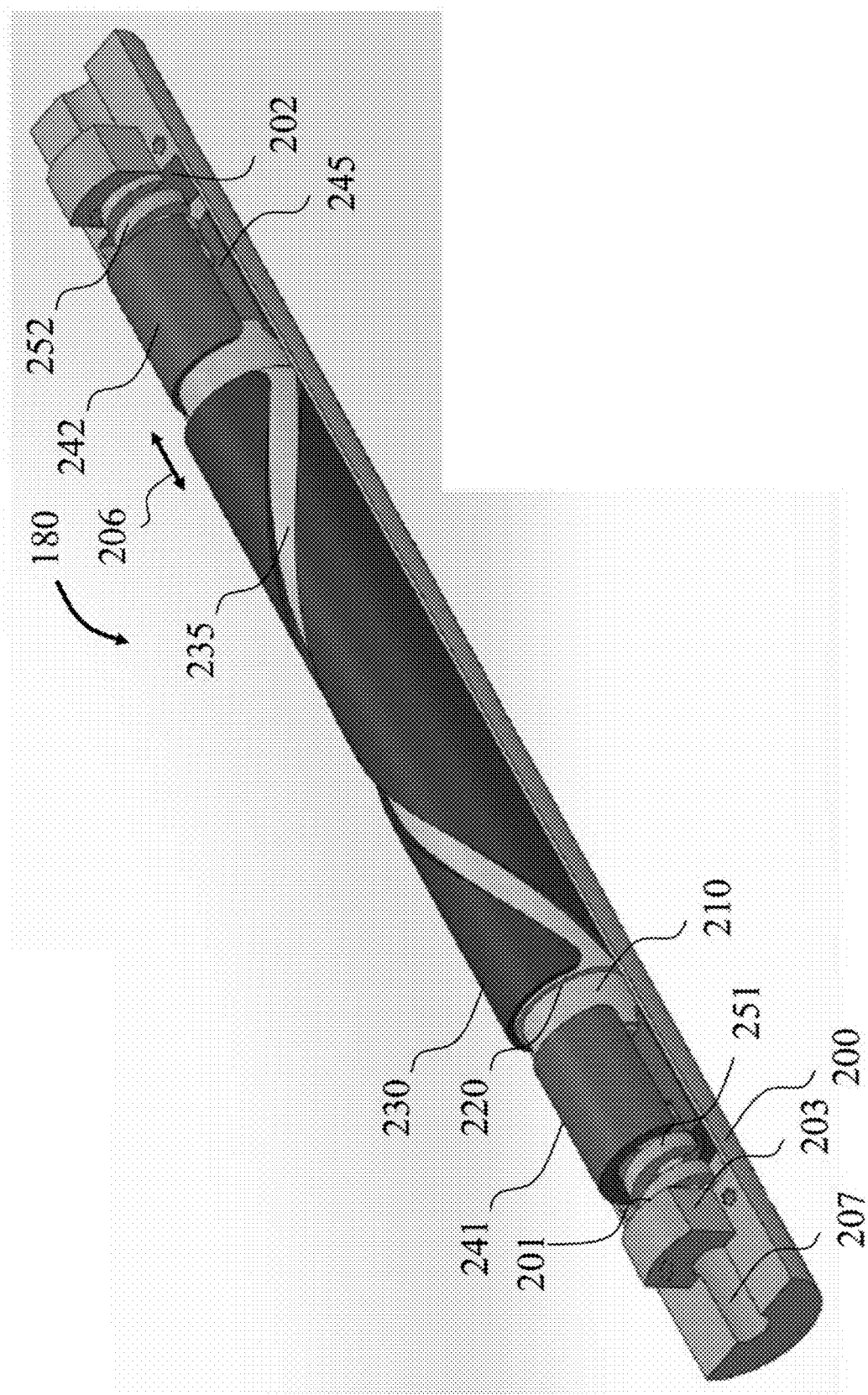
FIG. 2A is a 3-D view of a downhole gamma detector tool according to one embodiment of the present disclosure.

In aspects, the present disclosure is related to downhole drilling operations. Specifically, the present disclosure is related to protection of components of a downhole gamma detector which may be sensitive to the mechanical shock and vibrations that occur during drilling operations and may reduce the operating lifetime of the downhole gamma detector tool. The present invention is susceptible to embodiments of different forms. There are shown in the drawings, and herein will be described in detail, specific embodiments with the understanding that the present invention is to be considered an exemplification of the principles and is not intended to limit the present invention to that illustrated and described herein.

FIG. 1 shows a diagram of a drilling system 100 that includes a drilling rig 110 disposed on a surface 120 and above a borehole 130 in an earth formation 140. Disposed in the borehole 130 is drill string 150 with a drill bit 160 at the bottom of the borehole 130. Above the drill bit 160 is a bottom hole assembly 170 that includes a gamma detector tool 180. The gamma detector tool 180 may be configured for active or passive gamma measurements. While a single gamma detector tool 180 is shown, a drilling system may include multiple gamma detector tools 180.

FIG. 2A shows a 3-D view of the gamma detector tool 180 including a chassis 200 which is open to show a housing 210 of a gamma detector 260, 270 (FIG. 2B) inside. The chassis 200 may be substantially cylindrical in shape, configured for disposition in the borehole 130, and include a cavity 205 (FIG. 2C) into which the housing 210 may be inserted. The chassis includes a first end 201 and a second end 202 disposed on opposing sides of the gamma detector tool 180. In some embodiments, the chassis 200 may be formed from two halves, each of which are approximately half-shell complements of the other and configured to form the substantially cylindrical shape. The halves of the chassis 200 may be secured together by screws, welds, rivets, or other techniques that would be understood by a person of ordinary skill in the art. The gamma detector 260, 270 typically comprises a scintillator 260, which generates photons when exposed to gamma radiation, and an electronic light detector 270, which converts the photons into an electrical signal indicative of gamma radiation received by the scintillator 260. One non-limiting scintillator 260 is a scintillation crystal, though any scintillator suitable for downhole operations may be used as would be understood by a person of ordinary skill in the art. A non-limiting electronic light detector 270 is a photomultiplier tube, though any electronic light detector suitable for downhole operations may be used, including a photo diode and a silicon photomultiplier. The scintillation crystal 260 and the photomultiplier tube 270 inside the housing 210 may be damaged by mechanical shocks and vibrations that transmitted from the drill bit 160 to the gamma detector tool 180. Reduction of the magnitude of the shocks that reach the scintillation crystal 260 and the photomultiplier tube 270 from an direction along the longitudinal axis of the tool 180 and/or bottom hole assembly 170 may prevent damage to and increase the operating lifetime of the scintillation crystal 260, the photomultiplier tube 270, or both.

As shown, axial shock reduction is provided by axial shock reducers 251, 252, which are also disposed within the cavity 205 and in contact with the interior of the chassis 200. The axial shock reducers 251, 252 may be configured to dampen vibrations by either storing or dissipating the vibratory energy that would otherwise be transmitted to the scintillation crystal 260 and the photomultiplier tube 270. While the axial shock reducers 251, 252 are shown as springs, this is exemplary and illustrative only, as other suitable shock reducers, such as elastomers, as understood by a person of ordinary skill in the art may be used. The first axial shock reducer (spring) 251 is disposed between a first end 201 of the chassis 200 and a first end 211 of the housing 210, and the second axial shock reducer (spring) 252 is disposed between a second end 202 of the chassis 200 and a second end 212 of the housing 210. The springs 251, 252 may be compressed and configured to hold the housing 210 in position while dampening mechanical shocks and vibrations received through the chassis 200.

The ends 201, 202 also include a chassis wire shaft 207, which is configured to allow passage of wires connected to the gamma detector assembly to pass in and/or out of the chassis 200. The ends 201, 202 may each include a spring stop 203, which is configured to provide flat surfaces for the springs 251, 252 to contact the chassis 200. The springs 251, 252 may be configured with a stiffness to absorb shocks on the order of 1000 gravities. In some embodiments, the springs 251, 252 may be configured to damp shocks on the order of 2500 gravities. The arrows 206 indicate the longitudinal movement path of the housing 210. A pair of axial shock reducer adapters 241, 242 may be, optionally, disposed between the axial shock reducers 251, 252 and their ends 211, 212, respectively. Since springs are shown as the axial shock reducers in FIG. 2A, the axial shock reducer adapters 241, 242 are referred to as spring adapters, though the use of springs is exemplary only. The spring adapters 241, 242 may include gaps 245 that allow wires to pass between the outside of the springs 251, 252 and the chassis 200. The spring adapters 241, 242 may be configured to modify the distribution of spring forces from the springs 251, 252, into the ends 211, 212. In some embodiments, the scintillation crystal 260 and the photomultiplier 270 may each have their own housing (not shown) which are adjacent. When adjacent housings are used, the outside facing (non-adjacent) end of the scintillation crystal housing will be the first end 211 and the outside facing (non-adjacent) end of the photomultiplier housing will be the second end 212.

In some embodiments, the spring adapters 241, 242 may be configured to evenly distribute spring forces along the ends 211, 212. In some embodiments, the spring adapters 241, 242 may be configured to distribute the forces primarily on a perimeter 215 (FIG. 2C) of the ends 211, 212 of the housing 210.

The housing 210 may be optionally circumscribed by a sleeve 220. The sleeve 220 may be made of a material that is transparent to gamma radiation so as to not interfere with the passage of gamma rays from the earth formation 140 to the scintillation crystal 260. In some embodiments, the sleeve 220 may be made a material (not shown) that attenuates gamma radiation and include a slot or window (not shown) that is transparent (either a transparent material or a gap) that allows passage of the gamma radiation to the scintillation crystal 260. The gamma attenuating material may include a tungsten alloy.

The sleeve 220 may be shorter in length than the housing 210 and configured to provide a sliding surface on its interior so that the housing 210 may slide freely through the sleeve 220. The sleeve 220 may have an interior diameter that is only slightly larger than the largest outer diameter of the housing 210. In some embodiments, the difference in the interior diameter of the sleeve 220 and the largest outer diameter of the housing 210 may be about 0.02 inches (0.05 cm) or less. In some embodiments, the sleeve 220 may be metal and include an interior coating configured to reduce friction between the sleeve 220 and the housing 210. In one, non-limiting, embodiment, the sleeve 220 may be made of PTFE; however, illustrative and exemplary, as any other gamma transparent materials capable of providing a sliding interior surface in a borehole environment known to one ordinary skill in the art may be used. The sleeve 220 may be configured to stabilize the housing 210 within the chassis 200. The sleeve 220 may also reduce shocks to the scintillation crystal 260 and the photomultiplier tube 270 from directions lateral to the axis of the tool 180 and/or bottom hole assembly 170.

A lateral shock reducer 230 may circumscribe the sleeve 220. The lateral shock reducer 230 may be configured to reduce lateral (radial) shocks to the scintillation crystal 260 and the photomultiplier tube 270. The lateral shock reducer 230 may be comprised of an elastomeric material, such as silicone, which retains its elastomeric properties in a borehole environment. In some embodiments, the elastomeric material is configured to substantially retain its shock absorbing properties over a temperature range of about −50 degrees C. to about 175 degrees C. In some embodiments, the lateral shock reducer 230 may include a corrugated metal. The metal may be corrugated longitudinally, radially, or helically.

The lateral shock reducer 230 may have a gap 235 configured to allow the passage of wires from a first end 231 to a second end 232 of the lateral shock reducer 230. This gap may allow wires to traverse lateral shock reducer 230 on the surface of the sleeve 220 (or a thinned surface of the lateral shock reducer 230 itself). In some embodiments, the gap 235 may be a thinned portion (not shown) of the lateral shock reducer 230 rather than an absence of shock absorbing material. The gap 235 may be linear or non-linear. In some embodiments, the gap 235 may be helical along the surface of the lateral shock reducer 230.

Figure 2B:
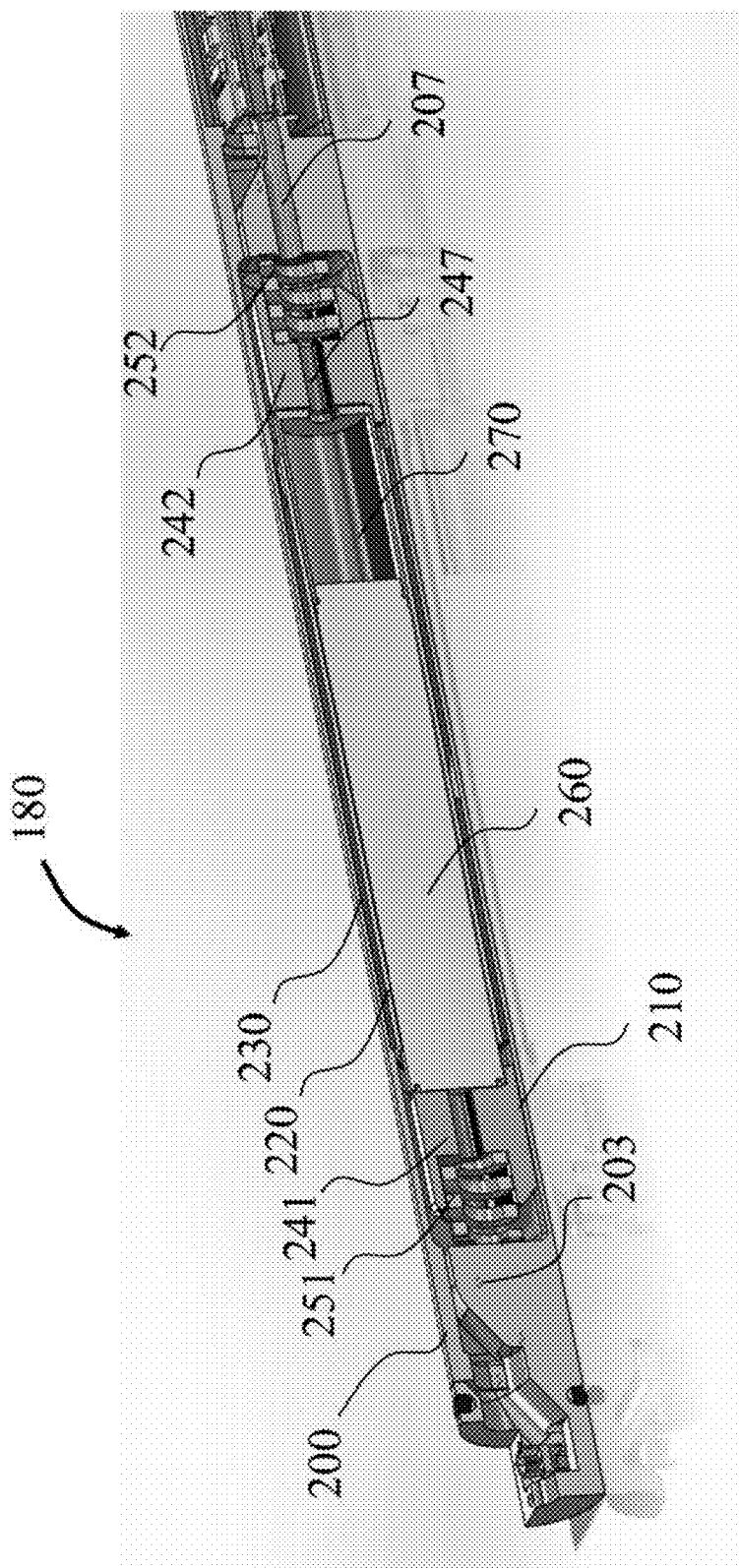
FIG. 2B is a cross-sectional view along the length of the tool of FIG. 2A.

FIG. 2B shows a cross-sectional view along the length of the gamma detector tool 180 of FIG. 2A. The interior of the housing 210 is shown with the scintillation crystal 260 disposed next to the first adapter 241 and the first spring 251 and the photomultiplier tube 270 disposed next to the second adapter 242 and the second spring 252. The spring adapters 241, 242 have a central shaft 247 for the passage of wires from the housing 210. The central shafts 247 are aligned with the centers of the springs 251, 252 and the chassis wire shaft 207.

Figure 2C:
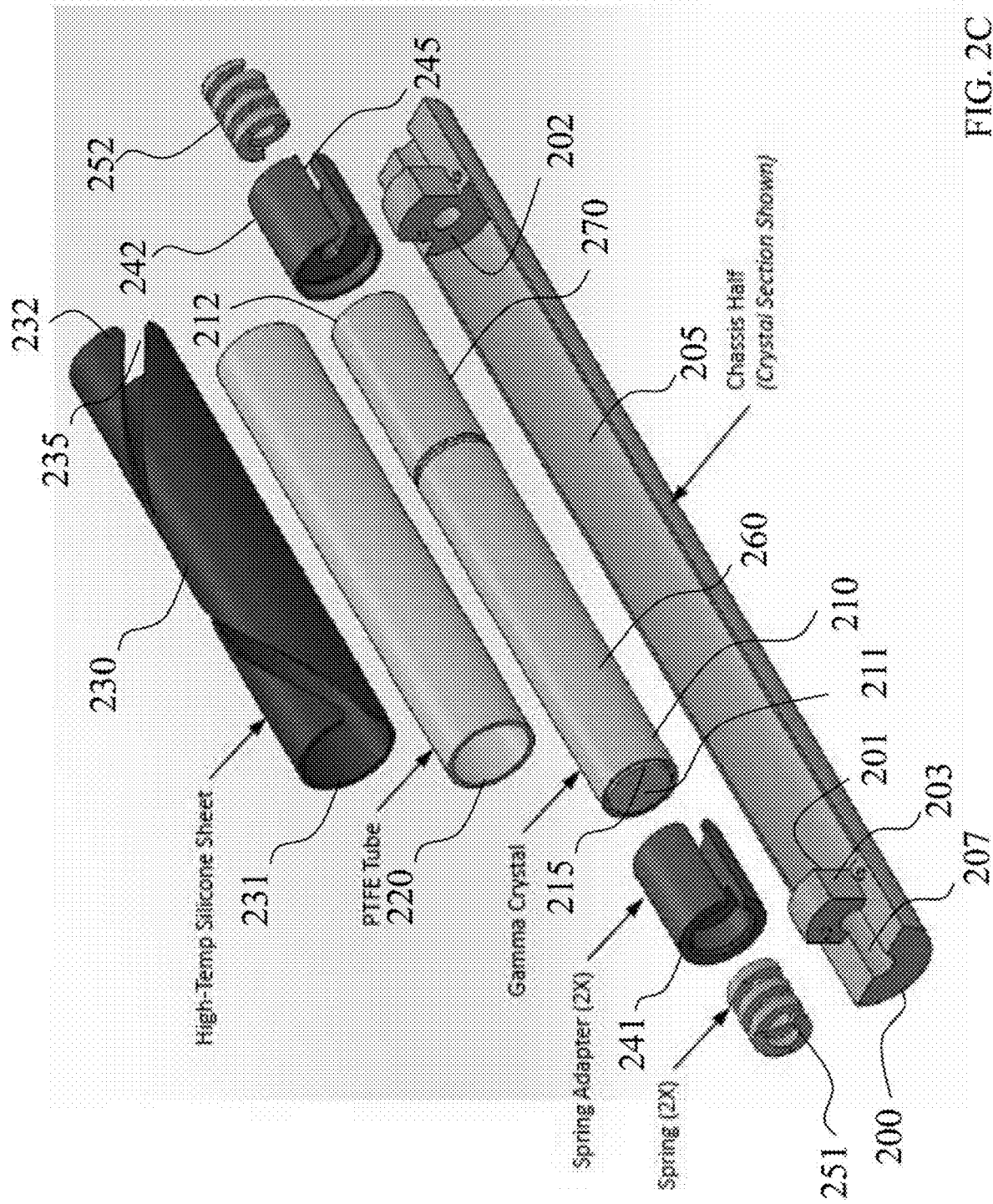
FIG. 2C is a 3-D exploded view of the tool of FIG. 2A.

FIG. 2C shows an exploded view of the gamma detector tool 180 of FIG. 2A. The perimeter 215 of the housing 210 can be seen. In some embodiments, the spring force of springs 251, 252 may be concentrated on the perimeter 215 by the spring adapters 241, 242. The concentration of the spring force on the perimeter 215 may reduce the shocks and vibrations are transmitted into the scintillation crystal 260 and the photomultiplier tube 270.

Figure 3:
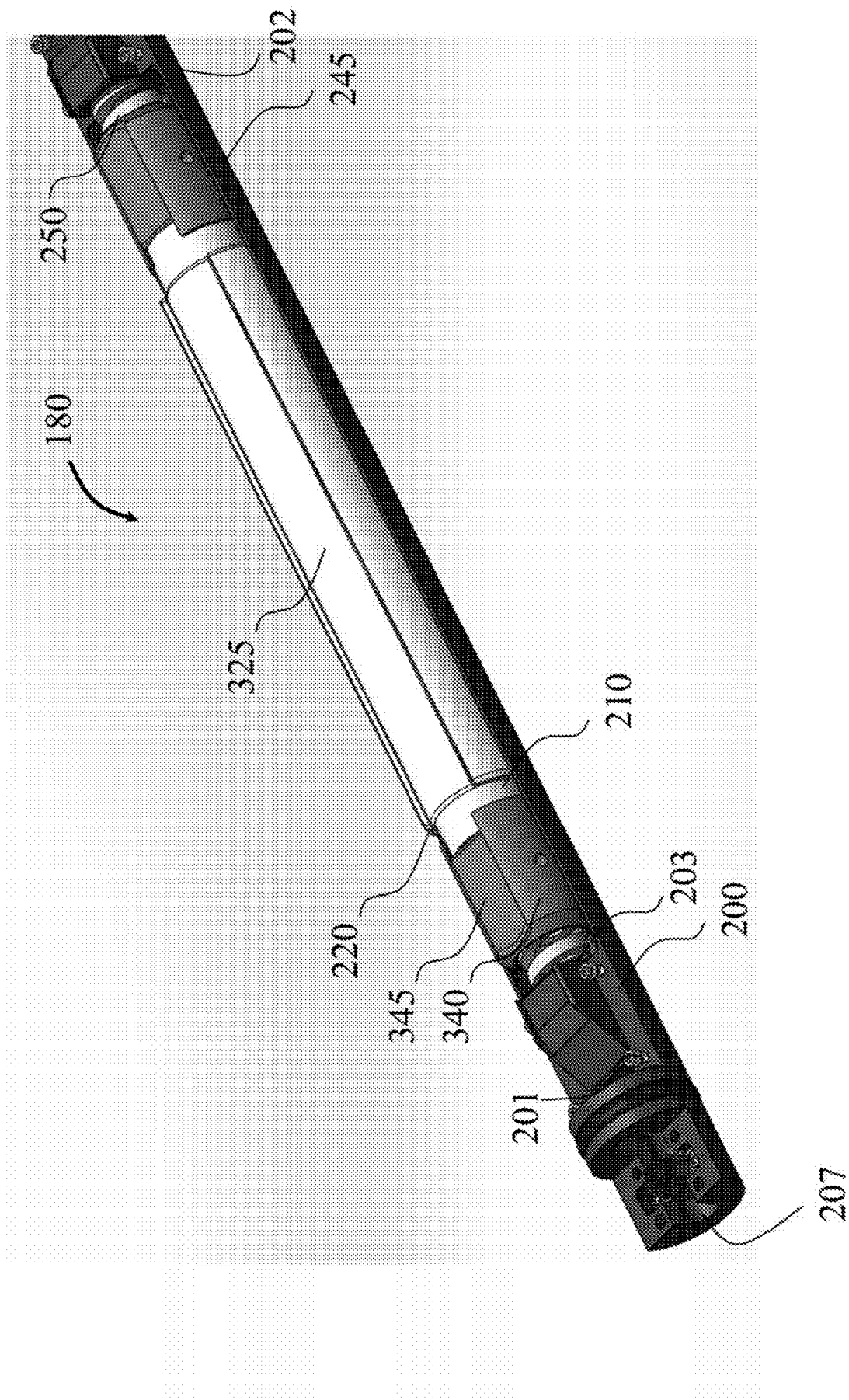
FIG. 3 is a 3-D view another embodiment of the gamma detector tool without a lateral shock reducer according to one embodiment of the present disclosure.

FIG. 3 shows a 3-D view another embodiment of the gamma detector tool 180 without part of the chassis 200. In this embodiment, the lateral shock reducer 230 is not present. The sleeve 220 includes a recessed area 325 (shown linear, but it may be non-linear) to allow the passage of wires between the sleeve 220 and the chassis 200. The recessed area 325 is aligned with recessed areas 345 of spring adapters 341, 342. The spring adapters 341, 342 are similar to the spring adapters 241, 242; however, the recessed areas 325 replace the gaps 245. Thus, wires passed along in the gap between the chassis 200 and the housing 210 do not need to comingle with wires passing from the housing 210 through either of the chassis wire shafts 207.

While the above apparatus is described in terms of a gamma tool, it is contemplated that the shock reducing aspects may be used with other downhole tools that are desired to be isolated from mechanical shocks and vibrations. The elimination or attenuation of shocks and vibrations may be employed with one or more of the axial shock reducers, lateral shock reducer, sleeve, and axial shock reducer adapters.

Figure 4:
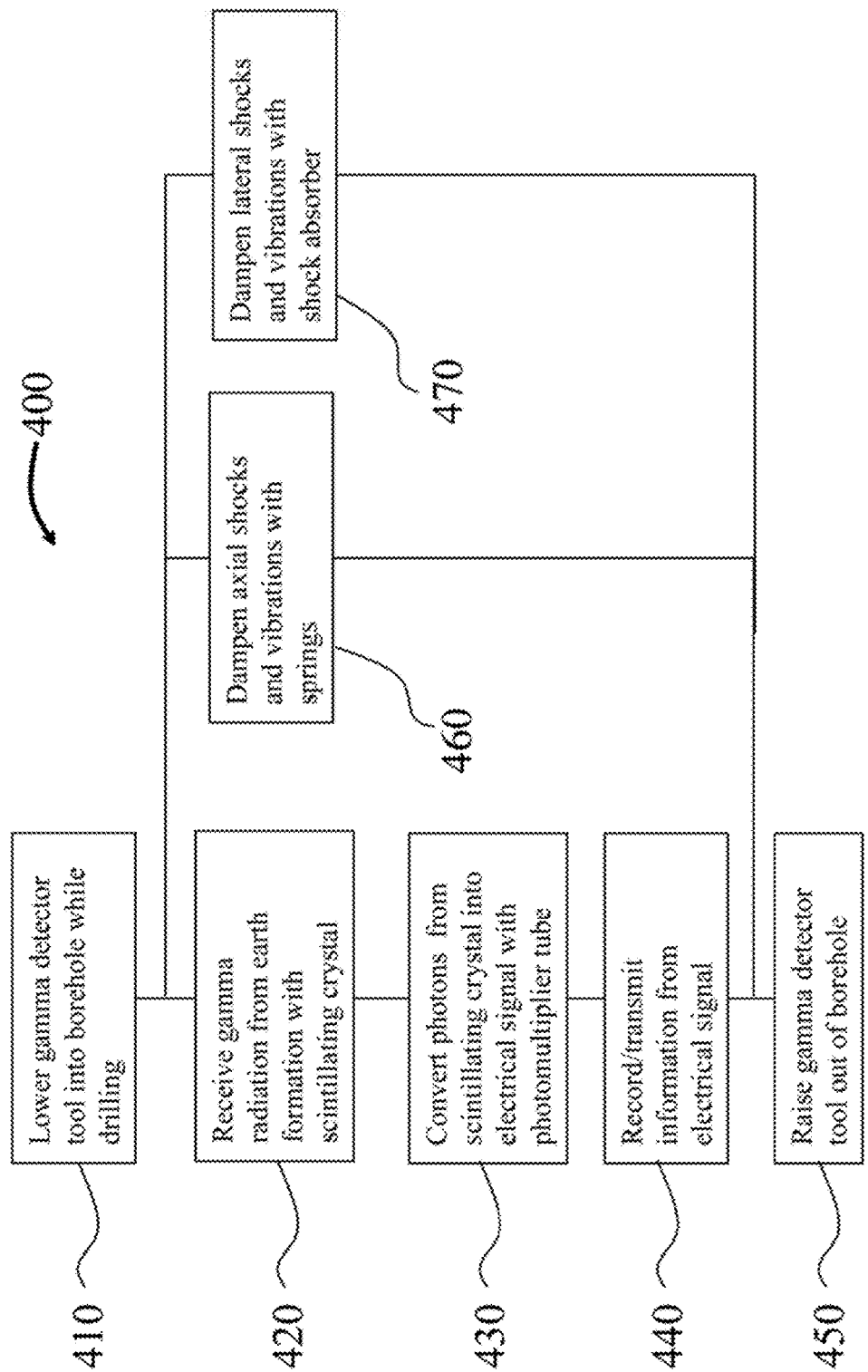
FIG. 4 is an exemplary method of using the gamma detector tool according to one embodiment of the present disclosure.

FIG. 4 shows a flow chart for a method 400 of estimating gamma ray emission in an earth formation 140 during a drilling operation. A drilling operation may include drilling, preparation for drilling, and post-drilling cleanup. In step 410, the gamma ray detector tool 180 may be lowered into the earth formation 140. The lowering may take place while the drill bit 160 is disintegrating part of the earth formation 140. In step 420, gamma radiation from the earth formation 140 may be received by the tool 180. In step 430, the gamma radiation may be converted into an electrical signal indicative of the gamma count by the tool 180. In step 440, the gamma count information may be recorded and/or transmitted to surface 120. The tool 180 may include some or all of the features and components shown in FIGS. 2A-2C or 3. In step 450, the tool 180 may be raised out of the borehole 130. In step 460, axial shocks and vibrations may be dampened by the springs 251, 252. In step 470, lateral shocks and vibrations may be dampened by the lateral shock reducer 230. In some embodiments, step 470 is optional. Any or both of steps 460 and 470 may be performed during any, some, or all of steps 410-450.

While embodiments in the present disclosure have been described in some detail, according to the preferred embodiments illustrated above, it is not meant to be limiting to modifications such as would be obvious to those skilled in the art.

The foregoing disclosure and description of the disclosure are illustrative and explanatory thereof, and various changes in the details of the illustrated apparatus and system, and the construction and the method of operation may be made without departing from the spirit of the disclosure.

What is claimed is:

1. An apparatus for detecting gamma radiation in a borehole, the apparatus comprising:
   a chassis configured to be disposed in the borehole;
   a gamma detector disposed in the chassis and comprising:
      a scintillation crystal responsive to gamma radiation; and
      a photomultiplier tube optically coupled to the scintillation crystal;
   a housing configured to circumscribe the gamma detector and having a first end and a second end;
   a sleeve configured to circumscribe the housing;
   a lateral shock reducer configured to circumscribe the sleeve and comprising a contiguous passage between a first end and a second end of the lateral shock reducer, wherein the contiguous passage is configured to allow passage of wires from the first end of the lateral shock reducer to the second end of the lateral shock reducer;
   a first axial shock reducer configured to be in mechanical communication with the first end of the housing and the chassis; and
   a second axial shock reducer configured to be in mechanical communication with the second end of the housing and the chassis.

2. The apparatus of claim 1, further comprising:
   a first axial shock reducer adapter disposed between the first axial shock reducer and the first end of the housing; and
   a second axial shock reducer adapter disposed between the second axial shock reducer and the second end of the housing.

3. The apparatus of claim 2, wherein the axial shock reducer adapters are configured to distribute a force of the axial shock reducers on the ends of the housing evenly.

4. The apparatus of claim 2, wherein the axial shock reducer adapters are configured to distribute a force of the axial shock reducers on the perimeter of the ends of the housing.

5. The apparatus of claim 1, wherein the sleeve comprises a recessed portion contiguous between a first end and a second end of the sleeve.

6. The apparatus of claim 1, wherein the contiguous passage is non-linear.

7. The apparatus of claim 1, wherein the contiguous passage is a recessed portion of the lateral shock reducer.

8. The apparatus of claim 1, wherein the contiguous passage is a gap extending through the lateral shock reducer.

9. The apparatus of claim 1, wherein the lateral shock reducer comprises an elastomeric material.

10. The apparatus of claim 9, wherein the elastomeric material comprises silicone.

11. The apparatus of claim 1, wherein the lateral shock reducer comprises a corrugated metal.

12. The apparatus of claim 11, wherein the corrugated metal is one of: i) radially corrugated, ii) longitudinally corrugated, and iii) helical corrugation.

13. The apparatus of claim 1, wherein the first axial shock reducer and the second axial shock reducer comprise springs.

14. An apparatus for detecting gamma radiation in a borehole, the apparatus comprising:
   a chassis configured to be disposed in the borehole;
   a gamma detector disposed in the chassis and comprising:
      a scintillation crystal responsive to gamma radiation;
      a housing configured to circumscribe the scintillation crystal and having an outside end;
      a photomultiplier tube optically coupled to the scintillation crystal; and
      a housing configured to circumscribe the photomultiplier tube and having an outside end;
   a sleeve configured to circumscribe the housings and comprising a recessed portion contiguous between a first end and a second end of the sleeve, wherein the recessed portion is configured to allow passage of wires from the first end of the sleeve to the second end of the sleeve;
   a lateral shock reducer configured to circumscribe the sleeve;
   a first axial shock reducer configured to be in mechanical communication with the outside end of the scintillation crystal housing and the chassis; and a second axial shock reducer configured to be in mechanical communication with the outside end of the photomultiplier tube housing and the chassis.

15. The apparatus of claim 14, further comprising:
a first axial shock reducer adapter disposed between the first axial shock reducer and the outside end of the scintillation crystal housing;
and a second axial shock reducer adapter disposed between the second axial shock reducer and the outside end of the photomultiplier tube housing.

16. The apparatus of claim 15, wherein the axial shock reducer adapters are configured to distribute a force of the axial shock reducers on the outside ends of the housings evenly.

17. The apparatus of claim 15, wherein the axial shock reducer adapters are configured to distribute a force of the axial shock reducers on the perimeter of the outside ends of the housings.

18. The apparatus of claim 14, wherein the lateral shock reducer comprises a contiguous passage between a first end and a second end of the lateral shock reducer.

19. The apparatus of claim 18, wherein the contiguous passage is non-linear.

20. The apparatus of claim 18, wherein the contiguous passage is a recessed portion of the lateral shock reducer.

21. The apparatus of claim 18, wherein the contiguous passage is a gap extending through the lateral shock reducer.

22. The apparatus of claim 14, wherein the lateral shock reducer comprises an elastomeric material.

23. The apparatus of claim 14, wherein the lateral shock reducer comprises a corrugated metal.

24. The apparatus of claim 23, wherein the corrugated metal is one of: i) radially corrugated, ii) longitudinally corrugated, and iii) helical corrugation.

25. The apparatus of claim 14, wherein the first axial shock reducer and the second axial shock reducer comprise springs.

26. A method for performing a gamma ray detection operation in a borehole, the method comprising:
dampening an axial shock to a gamma detector tool, the gamma detector tool comprising:
a chassis configured to be disposed in the borehole;
a gamma detector disposed in the chassis and comprising:
a scintillation crystal responsive to gamma radiation; and
a photomultiplier tube optically coupled to the scintillation crystal;
a housing configured to circumscribe the gamma detector and having a first end and a second end;
a sleeve configured to circumscribe the housing;
a lateral shock reducer configured to circumscribe the sleeve and comprising a contiguous passage between a first end and a second end of the lateral shock reducer, wherein the contiguous passage is configured to allow passage of wires from the first end of the lateral shock absorber to the second end of the lateral shock absorber;
a first axial shock reducer configured to be in mechanical communication with the first end of the housing and the chassis; and
a second axial shock reducer configured to be in mechanical communication with the second end of the housing and the chassis.

27. The method of claim 26, further comprising:
dampening a lateral shock to the gamma detector tool.

28. The method of claim 26, further comprising:
receiving gamma radiation from the earth formation with the scintillation crystal; and
converting the gamma radiation into a signal indicative of a gamma count.

29. The method of claim 26, wherein the dampening of the axial shock is performed during a drilling operation.

* * * * *